No. 863,845.
PATENTED AUG. 20, 1907.
J. F. HARDY.
GAME APPARATUS.
APPLICATION FILED NOV. 2, 1906.
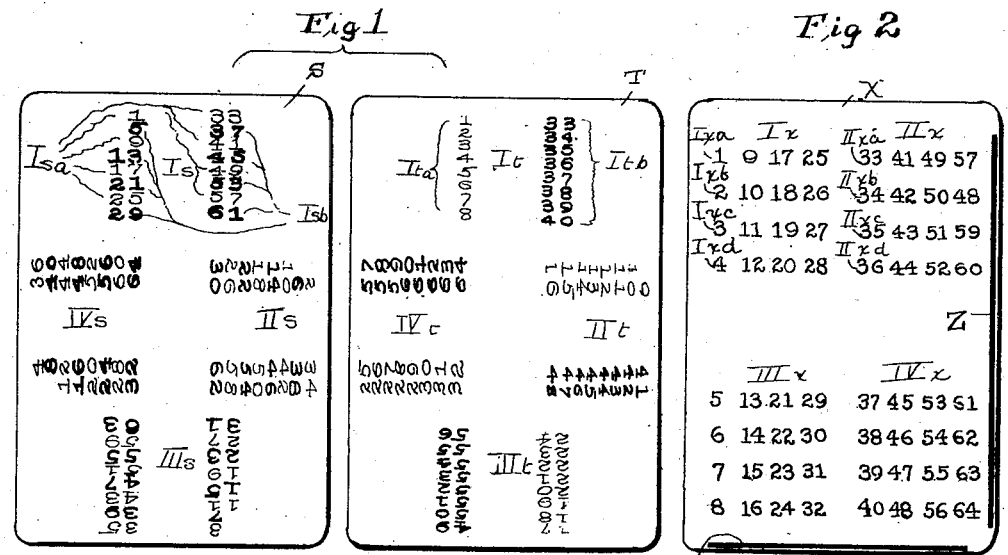
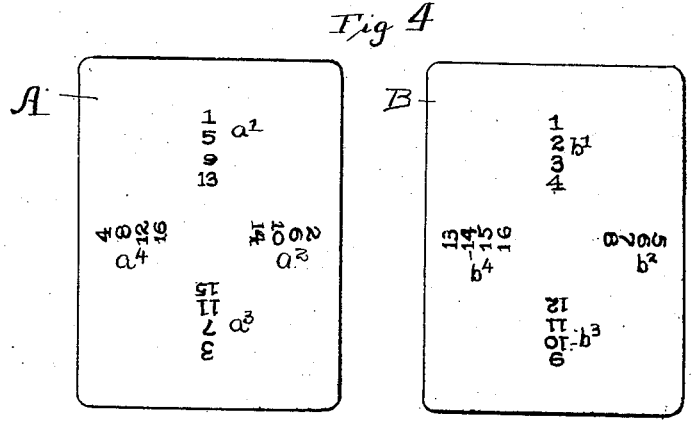
Witnesses:
Mary F. Allen.
Clyde Criswell
Inventor:
John F. Hardy
By Forest Bain
Attorneys

UNITED STATES PATENT OFFICE.

JOHN F. HARDY, OF CHICAGO, ILLINOIS.

GAME APPARATUS.

No. 863,845.   Specification of Letters Patent.   Patented Aug. 20, 1907.

Application filed November 2, 1906. Serial No. 341,699.

*To all whom it may concern:*

Be it known that I, JOHN F. HARDY, a citizen of the United States, residing at Chicago, in the county of Cook and State of Illinois, have invented certain new and useful Improvements in Game Apparatus, of which the following is a specification.

My invention relates to improvements in game apparatus, and has for its salient object to provide an apparatus whereby the initiated user of the apparatus, whom I will hereafter call the user, may by operations, in reality simple, but apparently occult, exactly determine a number initially unknown to him, and arbitrarily selected from a series of numbers by another party whom I may conveniently term the interlocutor.
Other and further objects of my invention may best be gathered from the following description, taken in conjunction with the accompanying drawing, wherein I have illustrated a practical embodiment of my invention in a form physically simple in construction, but so arranged as to make the operation of determining the selected number appear mysterious or abstruse to the interlocutor; wherein I have further shown the tables of numbers appearing in such practical embodiment in arrangement to facilitate the understanding thereof for purposes of this disclosure; and have also illustrated a simplified apparatus embodying some of the principles and features of my invention.

In the drawing: Figure 1 shows the front and rear faces of a card embodying features of my invention, and, Fig. 2 indicates a supplemental card conveniently employed in association with the card shown in Fig. 1 in the operation of determining an arbitrarily selected number. Fig. 3 shows in convenient arrangement for this disclosure the tables embodied in the cards shown in Fig. 1. Fig. 4 shows the front and rear faces of a simplified card embodying some of the features of my invention.

Throughout the drawing like characters of reference refer always to like parts.
A salient aim of my invention is to provide an apparatus embodying a limited series of numbers of which the interlocutor may arbitrarily choose a number for determination, the numbers being so arranged as to position and other distinguishing characteristics that from apparently unimportant information supplied by the interlocutor, consciously or unconsciously, the user may perform a series of eliminations enabling him to determine precisely the number had in mind by the interlocutor.
The general scheme which I employ is to provide for selection by the interlocutor of one number from a series of numbers constituting a power of 4—conveniently 64— and to so arrange such numbers in tables that by ascertaining the positions in the tables and characteristics of the arbitrarily selected number, the user may mentally, or by the use of an answer card, eliminate all numbers which do not fit the information gleaned from the interlocutor, and determine the number selected in the mind of the interlocutor. Such eliminations, in the use of a series of 64 characters are three in number— the first elimination reducing the quantity of possible numbers to one fourth the original number, or 16; the second elimination further reducing the quantity to one fourth of such remainder, or 4, and a third elimination reducing the possible numbers to one fourth of the last remainder, or 1, which is necessarily the number selected by the interlocutor.

In the preferred embodiment of my invention I use but two tables, for the interlocutor to handle, from which tables the user can by mental elimination determine the position in the tables of the selected number, and so be enabled to pick out from the tables such number. And I further provide, to lessen the mental work of the initiated user, an answer table to assist in the determination of the result and to enable him to call off the selected number without looking at the interlocutor's tables.

In Fig. 4 the underlying principle of operation is illustrated. Table A in Fig. 4 I will term a primary selection table, and table B a test table. Each table contains all numbers between 1 and 16, the series of numbers in the selection table A being quantitatively divided into four equal selection groups, of four numbers each, in order indicated as $a^1$, $a^2$, $a^3$ and $a^4$, and the selection table B being divided into a quantity of test groups whereof there are as many as there are numbers in any one of the selection groups, or four, indicated as $b^1$, $b^2$, $b^3$ and $b^4$. The arrangement of numbers in the test group is such that each number in any selection group appears in a different test group. For example, the numbers 1, 5, 9 and 13 of the selection group first in order, are arranged respectively at the heads of groups $b^1$, $b^2$, $b^3$ and $b^4$ of the test table B, the numbers of the second selection group appearing in second position in the test groups, and so on. Now it will be apparent that if the primary selection table be handed to the interlocutor and he be requested to mentally choose a number therefrom, (choosing, for instance, the number 10,) and he then informs the user simply what group this number is in, (the group second in order, or group $a^2$) and he then turns the test table, and informs the user merely what group the selected number is in, (the third in order, or $b^3$,) then the user can instantly determine, by reference to the tables, that the number is 10, for the number 10 is the only number appearing in both the second selection group, $a^2$, and the third test group $b^3$, of the selection and test tables A and B respectively. Moreover, it will be observed that the groups are arranged in order visually determinable by the user, that is in their respective tables in such manner as to require the interlocutor to turn the card or cards containing such groups to different positions for convenient reading of the numbers in the groups, so that in practice it is not necessary for the user to question the interlocutor as to the order of the groups wherein the number appears, as he can in a large majority of cases obtain the information by merely observing how the interlocutor holds the card when he announces his discovery of the selected number in each table.

In the preferred embodiment of my invention, referring to the primary card shown in Fig. 1, the quantity of numbers provided is 64 and consequently three eliminations must be provided for. To this end I divide the primary or selection table S into four divisions, indicated by the Roman numerals Is, IIs, IIIs, and IVs, which are arranged in order visually determinable, and each of which is subdivided into two equal, distinguishable selection groups, so that eight distinguishable groups are provided, the light numbers constituting four groups Isa, IIsa, IIIsa, and IVsa, and the black numbers being divided into four groups Isb, IIsb, IIIsb, and IVsb, so that in all there are eight groups of numbers, each containing eight numbers, the numbers in each group being preferably spaced eight apart. In the test table T the same numbers are divided into four test divisions arranged in order visually determinable and indicated respectively with the Roman numerals It, IIt, IIIt, and IVt, and each test division being subdivided into two equal, distinguishable test groups, each of which contains a quantity of numbers equal to the quantity of selection groups in the selection table, and such groups constituting each division being distinguishable from each other by the light or dark printing of the numbers therein. The light groups are indicated as Ita, IIta, etc., and the dark groups as Itb, IItb, etc.

In the distinguishing printing of the groups of the selection and test tables, half of the numbers light in the selection table are dark in the test table, the other half light in the selection table and also light in the test table. Thus eight distinguishable test groups are provided, and the arrangement of the numbers of the test groups relative to the arangement in the selection groups is such that each of the eight numbers in a selection group appears in a different test group.

It will be apparent that the operations of determining an arbitrarily-selected number are the same as those involved in the operation of the simpler tables shown in Fig. 4, save where that only two tables are employed, for three eliminations, as herein shown, and the differentiation between groups is made by the use of light and dark effect in the printing, the user must be verbally informed by the interlocutor whether the number is a "light" number or a "dark" number in each division wherein he finds it in the selection and test tables.

For purposes of conveniently carrying on the operation of determining the number selected, with facility, and without examination by the user of the selection and test tables, I preferably provide an answer card containing the same numbers as the selection and test tables, arranged in such order that the determination of the number selected may be simply performed. In the answer table the total quantity of numbers is divided into four divisions, I×, II×, etc., each of which contains all numbers which are similarly distinguished in the distinguishable subdivision of the selection and test divisions; that is to say, one answer division Ix contains all numbers which are light in the selection table and light in the test table, another division IIx, containing all numbers which are light in the selection table and dark in the test table and so on throughout the four permutations. Further, in each such answer division the numbers are subdivided into four groups, according to the order of the group of one interlocutor's table wherein such numbers appear, and the numbers are ordered in their respective answer groups according to the order of the group in which they appear in the other table handled by the interlocutor. For example, in the answer division containing all of the numbers, light in the selection group and light in the test group, such answer division is subdivided into four groups, Ixa, Ixb., etc., of which one (Ixa) contains all of the light numbers of the primary selection group, first in order, which are also light in the test table, the second answer group Ixb, of such division contains all of the light numbers of the second selection group, which are also light in the test table, and so on; and in every such answer group the numbers are arranged in order from left to right, corresponding with the order of the test group wherein they appear, that is to say, the first number in an answer group appears in the first test group, the second number in said answer group appears in the second test group, and so on.

Specifically in the answer card the two divisions containing all of the numbers which are dark in the selection table are arranged at that end of the card which we may term the "dark end", and indicated by a dark edge line Y, while all of the numbers dark in the test table appear in the two divisions vertically disposed on the right side of the card, and distinguished by the dark border line Z. By such ordering of divisions it will be seen that instantly it be known to the user that a desired, and to him unknown, number, is light in both the selection and test tables, then by process of elimination he knows that it is not at the right side of the card nor at the bottom of the card and, therefore, must be the upper left division I×, which contains all those numbers light in both the selection and answer tables. Any other relation of the distinguishing characteristic of the number in the two tables of course determines the position of the number in the answer table to be in some other division. Thus information as to which selection and which test group the number selected appears in (visually obtained) and information as to the distinguishing printing-face characteristic of the number in each table, (furnished by the interlocutor) enables the user to determine from his answer card the number selected.

The operation for example is as follows; Assume the interlocutor to select number 54. He looks for it in vain in the first group, turns the card and looks for it in the second group; finds the number and announces that it is dark. The user mentally notes that the number is in a division at the bottom of the answer card, and will appear in the second group of such division. The user then takes the interlocutor's card and turns it over, to present the test table, and the interlocutor again hunts for his number (54). This time the interlocutor finds his number in the third group (which is mentally noted by the user) and announces that the number is dark. Now the user knows that the number is in the bottom, right hand division, second group, third number, which on inspection is found to be 54.

Obviously the principles herein adverted to are applicable to various arrangements of the numbers, and the physical structure may be varied, so that it will be understood that my invention is not limited to the exact presentation shown.

Having thus described my invention, what I claim and desire to secure by Letters Patent, of the United States, is:

1. In an apparatus of the character described, a selection table, including a series of different numbers, quantitatively divided into a number of equal selection groups, and a test table including the same numbers as the selection table, divided into a quantity of test groups equal to the quantity of numbers in a selection group, and arranged with each number of any selection group appearing in a different test group.

2. In an apparatus of the character described, a selection table, a test table and an answer table, each embodying the same series of numbers, the numbers in the selection table being divided into equal selection groups of successive order, the number in the test table being divided into a quantity of test groups of successive order, each group containing as many numbers as there are selection groups, and embodying one number from each selection group, and the numbers in the answer table being positioned for the determination of any selected number of the series by relation with the characteristics of the selection and test groups wherein said number appears.

3. In an apparatus of the character described, a selection table, a test table, and an answer table, each embodying the same series of numbers, the numbers in the selection table being divided into equal groups of determinable order, the numbers in the test table being divided into a quantity of groups in determinable order, each containing as many numbers as there are selection groups, and embodying one number from each selection group; and the answer table being divided into groups wherein the numbers respond in the order of their containing groups to the order of the groups wherein they appear in one of the selection and test tables, and in position in their groups to the order of the groups wherein they appear in the other of the selection and test tables.

4. In an apparatus of the character described, a selection table comprising numbers in series constituting a power of the number 4, divided into equal groups, and a test table comprising like numbers divided into groups each containing as many numbers as there are selection groups, the numbers in any selection group appearing each in a different test group.

5. In an apparatus of the character described, a selection table of sixty four numbers divided into eight equal distinguishable groups, and a test table comprising the same numbers divided into eight distinguishable groups, each whereof embodies one number only from each of the selection groups.

6. In an apparatus of the character described, the combination of a selection table, comprising a series of numbers divided into equal selection divisions in determinable order, and each subdivided into equal distinguishable selection groups, a test table comprising the same numbers divided into equal test divisions in determinable order and each subdivided into equal distinguishable test groups, each containing a quantity of numbers equal to the quantity of selection groups, and arranged with each number in a selection group appearing in a different test group, and an answer table comprising the same numbers, divided into divisions each containing all numbers similarly distinguished in the distinguishable subdivisions of the selection and test divisions, the numbers in each such answer division being subdivided into groups according to the order of the group of one table wherein they appear and ordered in such answer subdivisions according to the order of the group wherein they appear in the other table.

7. In an apparatus of the character described, two tables embodying the same numbers in presentation characteristically different, combined with a single answer table embodying like numbers once only displayed and each arranged to respond to the characteristics thereof in the two tables first mentioned, for determination solely by such characteristics.

8. In an apparatus of the character described, cards embodying three tables, each containing sixty four numbers, viz; a selection table, divided into four divisions, in order visually determinable, each subdivided into two groups distinguishably printed; a test table likewise divided into four divisions in visually determinable order, each subdivided into two groups distinguishably printed, the numbers in any selection group appearing one in each test group, and half of the numbers distinguished by one printing characteristic in the selection table being distinguished by the other printing characteristic in the test table; and an answer card divided into four divisions each containing all numbers similarly distinguished as to printing characteristics in the selection and test tables, each such division being divided into four groups each whereof contains all numbers of such answer division which appear in a division of one of the selection and test tables corresponding in order with the order of the answer group in its answer division, and the numbers in each such group being ordered to correspond with the order of the divisions of the other table wherein they appear.

In testimony whereof I hereunto set my hand in the presence of two witnesses.

JOHN F. HARDY.

In the presence of—
 FORÉE BAIN,
 MARY F. ALLEN.